(12) United States Patent
Ku et al.

(10) Patent No.: US 7,838,593 B2
(45) Date of Patent: *Nov. 23, 2010

(54) FLAME RETARDANT POLYMER COMPOSITION

(75) Inventors: Jeong Hwan Ku, Gunpo-si (KR); Sang Hyun Hong, Gunpo-si (KR); Su Hak Bae, Seoul (KR)

(73) Assignee: Cheil Industries, Inc., Gyungsangbuk-do (KR)

( * ) Notice: Subject to any disclaimer, the term of this patent is extended or adjusted under 35 U.S.C. 154(b) by 1086 days.

This patent is subject to a terminal disclaimer.

(21) Appl. No.: 11/416,870

(22) Filed: May 2, 2006

(65) Prior Publication Data

US 2007/0032579 A1 Feb. 8, 2007

(30) Foreign Application Priority Data

Aug. 8, 2005 (KR) .................... 10-2005-0072439

(51) Int. Cl.
*C08K 5/49* (2006.01)

(52) U.S. Cl. .................... 524/710; 524/508; 524/583; 526/328; 526/329.3; 526/329.2; 526/335

(58) Field of Classification Search ............. 526/328, 526/329.3, 329.2, 335; 524/508, 583, 710
See application file for complete search history.

(56) References Cited

U.S. PATENT DOCUMENTS

| | | | |
|---|---|---|---|
| 3,639,506 | A | 2/1972 | Haaf |
| 3,789,901 | A | 2/1974 | Rishovd |
| 3,849,368 | A | 11/1974 | Anderson et al. |
| 3,883,613 | A | 5/1975 | Cooper |
| 4,459,381 | A | 7/1984 | Trivedi |
| 4,526,917 | A | 7/1985 | Axelrod |
| 4,618,633 | A | 10/1986 | Taubitz |
| 4,632,946 | A | 12/1986 | Muench |
| 5,030,674 | A | 7/1991 | Notorgiacomo |
| 5,710,305 | A | 1/1998 | Archer et al. |
| 6,054,515 | A | 4/2000 | Blount |
| 6,306,941 | B1 | 10/2001 | Klatt et al. |

| | | | |
|---|---|---|---|
| 2006/0183825 | A1 | 8/2006 | Hong et al. |
| 2006/0183826 | A1 | 8/2006 | Ryu et al. |
| 2006/0189729 | A1 | 8/2006 | Bae et al. |
| 2006/0189730 | A1 | 8/2006 | Hong et al. |

FOREIGN PATENT DOCUMENTS

| | | | |
|---|---|---|---|
| DE | 42 09 029 A1 | | 9/1993 |
| DE | 19 637 368 | | 3/1998 |
| EP | 0 075 863 | * | 4/1983 |
| EP | 0 758 654 | | 2/1997 |
| EP | 1 069 157 A1 | * | 1/2001 |
| EP | 1 069 157 A1 | | 7/2001 |
| EP | 1 262 519 | | 12/2002 |
| GB | 2 003 888 | | 3/1979 |
| JP | 61009450 | | 1/1986 |
| KR | 1020040003563 | | 1/2004 |
| KR | 1020040027104 | | 4/2004 |
| KR | 2004-0059912 | | 7/2004 |
| KR | 1020050070921 | | 7/2005 |
| WO | WO 2004 029143 | | 4/2004 |
| WO | WO 2005 012416 | | 2/2005 |
| WO | WO 2005 012418 | | 2/2005 |
| WO | WO 2005 012420 | | 2/2005 |
| WO | WO 2005 017030 | | 2/2005 |

OTHER PUBLICATIONS

Abstract of DE 4209029 published Sep. 23, 1993.
European Search Report completed Aug. 7, 2008.
Abstract XP002393756 which relates to Abstract of JP 61009450 published Jan. 17, 1986.
Abstract of JP 61009450 published Jan. 17, 1986.
European Search Report for related application completed Mar. 12, 2007 with Annex.
Search Report from EPO dated Aug. 25, 2009.
Abstract of 1020040003563 published Jan. 13, 2004.
Abstract of 1020040027104 published Apr. 1, 2004.
Abstract of 102005007921, Republic of Korea, published Jul. 7, 2005.

\* cited by examiner

*Primary Examiner*—Ling-Siu Choi
(74) *Attorney, Agent, or Firm*—Maria Parrish Tungol

(57) ABSTRACT

A flame retardant molding composition includes a rubber modified aromatic vinyl resin, a polyphenylene ether resin, and a cyclic phosphonate ester compound. A shaped article and an electronic device can be made from the flame retardant molding composition.

18 Claims, 1 Drawing Sheet

FLAME RETARDANT POLYMER COMPOSITION

CROSS-REFERENCE TO RELATED APPLICATIONS

This non-provisional application claims priority under 35 U.S.C. §119(a) on Korean Patent Application No. 2005-72439 filed on Aug. 8, 2005, which is herein incorporated by reference.

BACKGROUND

1. Field

The invention relates to flame retardant molding composition that can be used to make molded articles with good physical and mechanical properties.

2. Description of the Related Technology

Thermoplastic resin blends are commonly used in electronic and non-electronic devices. Researchers have tried to achieve resins that have good heat resistance, impact strength, dimensional stability, and thermal stability. Polyphenylene ether resins have many of these qualities; however it has poor processability. To improve its processability, polyphenylene ether resins may be blended with styrene resins. While imparting better processabilitty, this combination typically results in reduced impact strength. Attempts to further improve the impact strength in such compositions have been made. However, they usually result in the deterioration of surface gloss and processability.

Flame retardant thermoplastic resin blends are required in some electronic products. A widely known method for imparting flame retardancy is the addition of a halogen-containing compound with an optional antimony catalyst. The inclusion of a halogen containing compound for flame retardancy may make the resin toxic. Therefore, non-halogenated compounds for use as flame retardants are desirable.

Cyclic alkyl phosphonate ester compounds have been known to impart flame retardancy to some resins. While providing excellent flame retardancy without deteriorating impact strength, known cyclic alkyl phosphonate ester compounds have poor thermal stability, often resulting in the occurrence of discoloration and yellow streak on the surface of the resin composition when it is subjected to high temperatures. Thus, there is a need to develop a resin with excellent thermal stability which exhibits substantially no discoloration when exposed to heat.

SUMMARY OF THE INVENTION

According to some embodiments, there is a polymer composition comprising a rubber modified vinyl resin comprising, a polyphenylene ether resin, and a cyclic phosphonate ester compound represented by Formula (I):

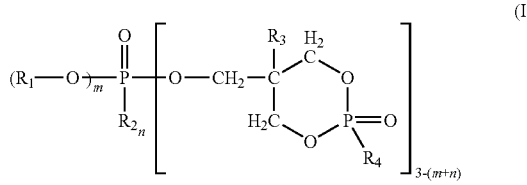

In the formula, $R_1$, $R_2$ and $R_4$ are independently $C_2$-$C_{10}$ alkyl group, $R_3$ is ethyl, m and n are independently 0, 1 or 2, more preferably 1 or 2, and (m+n) is 1 or 2.

One embodiment of the polymer composition includes about 40 to 95 parts by weight of a rubber modified aromatic vinyl resin, about 5 to 60 parts by weight of a polyphenylene ether resin, and about 0.1 to about 30 parts by weight of a cyclic phosphonate ester compound, represented by Formula (I).

In some embodiments, the rubber modified aromatic vinyl resin includes a styrene-containing graft copolymer resin, and a vinyl resin, wherein the vinyl resin optionally comprises rubber. In these embodiments, the styrene-containing graft copolymer resin can, but need not, include a rubber from about 10 to about 60 parts by weight and a styrene-acrylonitrile copolymer from about 40 to about 90 parts by weight. Also, the vinyl resin can, but need not, include about 0.1 to about 20 parts by weight of rubber selected from the group consisting of a butadiene rubber, an isoprene rubber, a copolymer of butadiene and styrene, an alkyl acrylate rubber, and combinations thereof. One example of the polyphenylene ether resin is poly(2,6-dimethyl-1,4-phenylene)ether.

In certain embodiments, the composition can also include an aromatic phosphate ester. For example, the aromatic phosphate ester can have the following structure:

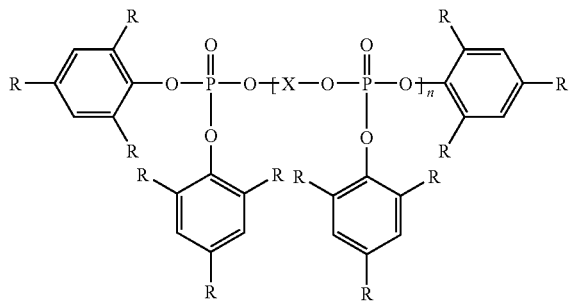

In the formula, R is independently hydrogen or $C_{1-4}$ alkyl. In embodiments, X is derived from an aryl compound comprising at least two hydroxy groups. In embodiments, n is an integer of 0, 1, 2, 3, or 4. In some embodiments, the aryl compound comprising at least two hydroxy groups is selected from the group consisting of resorcinol, hydroquinone, bisphenol-A, and combinations thereof. In other embodiments, X comprises an arylene or multiple aryl groups.

The composition in some embodiments also includes at least one of the following: a flame retardant, an anti-dripping agent, an impact modifier, a plasticizer, an inorganic filler, a heat stabilizer, an anti-oxidant, a compatibilizer, a light stabilizer, a pigment, a dye, and combinations thereof.

An advantageous property that need not be present in all embodiments of the molding composition is if the composition has a flame retardancy of V-0 when a specimen of the composition is evaluated according to UL-94VB standards for a specimen thickness of $\frac{1}{12}$".

The composition may be shaped in the form of an article. Advantageously, some embodiments of the molded article have a ΔE less than about 0.5 at 270° C.

Another aspect of the present invention relates to an electronic device that includes an electrical circuit, and a housing generally enclosing the electrical circuit. The housing may have a portion made of the aforementioned molding composition. Advantageously, some embodiments of the electronic device have ΔE from about 0 to about 0.5 at 270° C. and/or a flame retardancy of V-0 when a specimen of the portion is evaluated according to UL-94VB standards for a specimen thickness of $\frac{1}{12}$".

Another aspect of the invention relates to a method of making an electronic device. This method includes providing an electrical circuit, providing a housing comprising a portion made of the aforementioned molding composition, and enclosing the electrical circuit with the housing. In some embodiments, the portion comprises the molding composition of certain embodiments described herein.

DETAILED DESCRIPTION OF EMBODIMENTS

Figure 1:
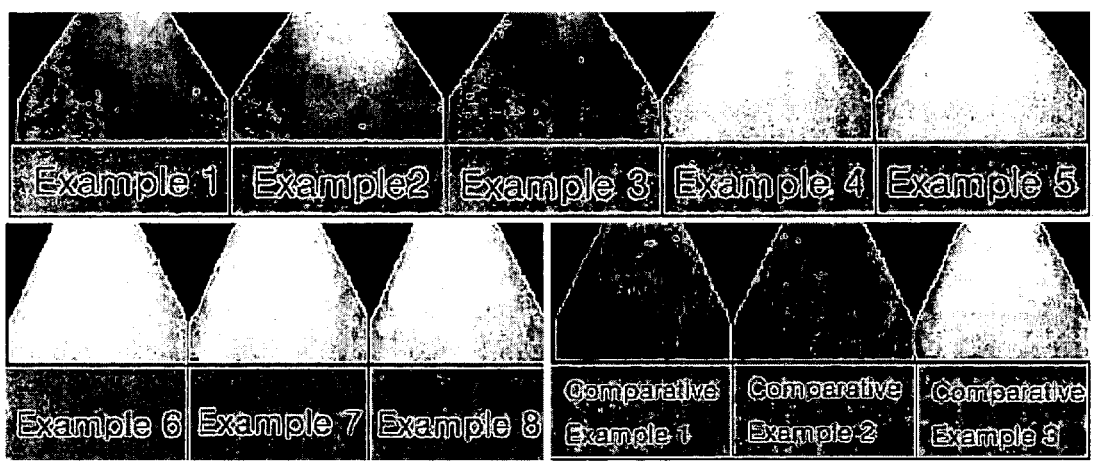
FIG. 1 is a photograph of test specimens of the Examples and Comparative Examples after molding at 300° C. showing whether a yellow streak was generated.

As noted above, one aspect of this invention relates to a polymer composition. According to various embodiments, the polymer composition comprises a rubber-modified aromatic vinyl resin, a polyphenylene ether resin, and a cyclic alkyl phosphonate compound. Additionally, some embodiments also comprise an aromatic phosphate ester compound as described below. Shaped articles comprising the polymer compositions of the embodiments show enhanced physical or mechanical properties as compared to other compositions less one or more components. The shaped articles of the embodiments also demonstrate improved flame retardancy and thermal stability over compositions less one or more components. As will be discussed, the shaped articles according to embodiments of the invention have good flame retardancy, color dexterity, and thermal stability, while maintaining a good balance of other physical and mechanical properties.

In embodiments, a composition comprises a rubber-modified aromatic vinyl resin, a polyphenylene ether resin, and a cyclic phosphonate ester. In certain embodiments, the cyclic phosphonate ester is represented by Formula (I):

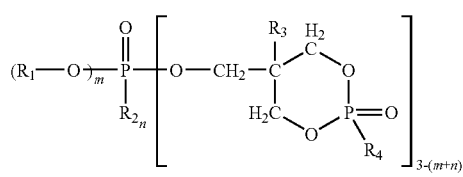

(I)

wherein $R_1$, $R_2$ and $R_4$ are independently $C_2$-$C_{10}$ alkyl group, $R_3$ is ethyl, m and n are independently 0, 1 or 2, and (m+n) is 1 or 2.

In certain embodiments, the composition comprises about 40 to 95 parts, preferably about 50 to 90 parts, more preferably about 70 to 90 parts by weight of a rubber modified aromatic vinyl resin, about 5 to 60 parts, preferably about 10 to 50 parts, more preferably about 20 to 40 parts and still more preferably about 25 to 35 parts by weight of a polyphenylene ether resin, and about 0.1 to 30 parts, preferably about 1 to 25 parts, more preferably about 1 to 20 parts, and still more preferably about 1 to 15 parts by weight of a cyclic phosphonate ester. In other embodiments, the molding composition comprises about 5 to 20 parts, and still more preferably about 10 to 20 parts by weight of a cyclic phosphonate ester.

In certain embodiments, the composition further comprises about 0 to 20 parts, more preferably about 5 to 15 parts by weight of an aromatic phosphate ester. Aromatic phosphate esters are further described herein.

Rubber Modified Aromatic Vinyl Resin

In embodiments, the rubber modified aromatic vinyl resin can be a polymer in which rubber phase polymers are dispersed in the form of particles in a matrix obtained by polymerizing vinyl group-containing monomers. In embodiments, the vinyl group-containing monomers may include aromatic vinyl monomers such as a styrene monomer. Generally, rubber modified aromatic vinyl resins may be prepared by polymerizing the vinyl group-containing monomers with rubbers. In embodiments, aromatic vinyl monomers may be polymerized with other vinyl group-containing monomers and other rubber containing monomers.

In particular embodiments, the rubber modified aromatic vinyl resin comprises ($a_1$) a styrene containing graft copolymer resin and ($a_2$) a vinyl resin that may optionally comprises rubber.

In embodiments, rubber modified aromatic vinyl resin may be prepared by methods such as emulsion polymerization, suspension polymerization, bulk polymerization, or extrusion of a graft copolymer resin with another copolymer resin. In a bulk polymerization, both graft copolymer resin and copolymer resin are prepared together in one process. In other polymerizations, the graft copolymer resin and the copolymer resin may be prepared separately. Thus, the polymerizations of the components of the resin may take place separately or together.

Examples of rubber modified vinyl aromatic resins are copolymers of acrylonitrile-butadiene-styrene (ABS), copolymers of acrylonitrile-acrylic rubber-styrene (AAS), copolymers of acrylonitrile-ethylenepropylene rubber-styrene, and so on. In embodiments of the rubber modified aromatic vinyl resin, a graft copolymer resin may be used alone or in combination with a copolymer resin depending on the compatability of the graft copolymer resin with such a copolymer resin.

In embodiments, the rubber modified aromatic vinyl resin comprises a styrene-containing graft copolymer resin and a vinyl resin, wherein the vinyl resin optionally comprises rubber. Preferably, the rubber modified aromatic vinyl resin comprises about 10 to 60% by weight of a styrene-containing graft copolymer resin and about 40 to 90% by weight of a vinyl resin. In some embodiments, the rubber modified aromatic vinyl resin comprises about 1, 3, 5, 7, 9, 10, 12, 14, 16, 18, 20, 22, 24, 26, 28, 30, 32, 34, 36, 38, 40, 42, 44, 46, 48, 50, 52, 54, 56, 58, 60, 62, 65, 70, and 75% by weight of a styrene-containing graft copolymer resin. Some embodiments of the rubber modified aromatic vinyl resin comprises about 25, 30, 35, 40, 42, 44, 46, 48, 50, 52, 54, 56, 58, 60, 62, 64, 66, 68, 70, 72, 74, 76, 78, 80, 82, 84, 86, 88, 90, 93, and 95% by weight of a vinyl resin which optionally comprises rubber.

The styrene containing graft copolymer resin comprises repeating groups of styrene monomers, including by not limited to, styrene, a-methyl styrene, p-methyl styrene, o-methyl styrene, m-methyl styrene, ethyl styrene, iso-butyl styrene, tert-butyl styrene, a halogenated styrene, and so forth. Some of these monomers and the polymers made from such monomers can be made more impact resistant by the inclusion of elastomeric materials (rubbers) in the matrix or continuous phase of the composition.

In embodiments, rubbers can include diene rubbers such as polybutadiene, poly(styrene-butadiene), poly(acrylonitrile-butadiene), etc; saturated rubbers in which hydrogen is added to said diene-containing rubber; isoprene rubber, chloroprene rubber; acryl rubbers such as polybutyl acrylic acid; and terpolymer of ethylene-propylene-diene (EPDM). In embodiments, the average size of rubber particles is preferably in the range of from about 0.1 to about 0.5 μm.

In embodiments of the graft copolymer resin, at least one other monomer copolymerizable with the aromatic vinyl monomer (styrenic monomers) can be introduced. These monomers which may be copolymerized with the aromated vinyl monomers may include a cyanide vinyl-containing compound such as acrylonitrile or an unsaturated nitrile-containing compound such as methacrylonitrile. For example, styrene or styrenic containing monomers may be reacted with acrylonitrile monomers to form styrene-acrylonitrile (SAN) copolymers. In some embodiments, the styrene containing graft copolymer may be prepared by graft copolymerizing from about 10 to about 60 parts by weight of a rubber with about 50 to about 99.5 parts by weight of SAN copolymer comprising about 0 to about 40 parts by weight of an acrylonitrile and about 60 to about 100 parts by weight of styrene or a styrenic containing monomer.

Some embodiments of the styrene containing graft copolymer may also include monomers such as acrylic acid, methacrylic acid, maleic anhydride, N-substituted maleimide, and the like. These monomers may be present in about 0 to about 40 parts by weight based on the weight of the styrene containing graft copolymer totaling 100 parts by weight.

In some embodiments, the vinyl resin of the rubber modified aromatic vinyl resin comprises at least one vinyl monomer, and optionally may comprise a rubber. The vinyl resin may be prepared by emulsion polymerization, suspension polymerization, bulk polymerization, or a combination thereof.

For example, one embodiment may be prepared by polymerizing at least one vinyl monomer. In some embodiments, a vinyl monomer may be selected from a group consisting of an aromatic alkenyl monomer, an alkyl ester acrylate monomer, an alkyl ester methacrylate monomer, and so forth.

In other embodiments, the vinyl monomer may be copolymerized with a rubber. The rubber may be selected from the group comprising a butadiene rubber, an isoprene rubber, a copolymer of a butadiene and a styrene, an alkyl acrylate rubber, and combinations thereof. In some embodiments, the vinyl resin includes rubber. In some of these embodiments, the vinyl resin comprises from about 80 to about 100 parts of the vinyl monomer and from about 0 to about 20 parts by weight of a rubber. The polymerization may take place in any manner including bulk-polmerization. Bulk-polymerization can occur through the use of at least one initiator selected from the group consisting of benzoylperoxide, t-butyl hydroperoxide, acetyl peroxide, cumene hydroperoxide, and combinations thereof.

One or more vinyl resins may be used in some embodiments. Any of these vinyl resins may optionally include a rubber, and may be used in conjunction with other vinyl resins with or without rubber.

In embodiments of the polymer composition, the rubber modified aromatic vinyl resin may be about 20, 22, 24, 26, 28, 30, 32, 34, 36, 38, 40, 42, 44, 46, 48, 50, 52, 54, 56, 58, 60, 62, 64, 66, 68, 70, 72, 74, 76, 78, 80, 82, 84, 86, 88, 90, 92, 94, 95, 96, 97, 98, and 99 parts by weight, based on the total weight of the rubber modified aromatic vinyl resin and the polyphenylene ether resin.

Polyphenylene Ether (PPE)

Polyphenylene ether has been extensively used due to its superiority in its mechanical properties, electrical properties and heat resistance and further superiority in its dimensional stability. In embodiments, polyphenylene ether may be a homopolymer and/or a copolymer comprising a structural unit of the following Formula:

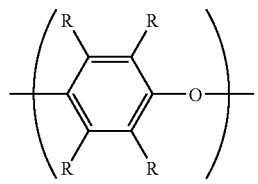

wherein R may independently represent hydrogen, halogen, alkyl, aryl, substituted alkyl, substituted aryl, hydrocarbyloxy, and combinations thereof.

Examples of polyphenylene ether resin include poly(2,6-dimethyl-1,4-phenylene)ether, poly(2,6-diethyl-1,4-phenylene)ether, poly(2,6-dipropyl-1,4-phenylene)ether, poly(2-methyl-6-ethyl-1,4-phenylene)ether, poly(2-methyl-6-propyl-1,4-phenylene)ether, poly(2-ethyl-6-propyl-1,4-phenylene)ether, poly(2,6-diphenyl-1,4-phenylene)ether, copolymer of poly(2,6-dimethyl-1,4-phenylene)ether and poly(2,3,6-trimethyl-1,4-phenylene)ether, and copolymer of poly(2,6-dimethyl-1,4-pheylene)ether and poly(2,3,5-triethyl-1,4-phenylene)ether. In embodiments, copolymer of poly(2,6-dimethyl-1,4-phenylene)ether and poly(2,3,6-trimethyl-1,4-phenylene)ether, and poly(2,6-dimethyl-1,4-phenylene)ether are used.

A mixture of two or more polyphenylene ethers may also be used in some embodiments. The degree of polymerization of polyphenylene ether is not limited specifically. However, it is preferable that the viscosity of polypheylene ether or the combination of the each polyphenylene ether in the mixture is in the range of about 0.2 to 0.8 g/dl measured in chloroform solvent at 25° C. However, this is merely a preferred range, and some embodiments may extend beyond this range.

In embodiments, the polymer composition comprises about 5 to about 60 parts by weight of the polyphenylene ether resin. Some embodiments of the polymer composition comprise about 2, 2.5, 3, 3.5, 4, 5, 6, 8, 10, 12, 14, 16, 18, 20, 22, 24, 26, 28, 30, 32, 34, 36, 38, 40, 42, 44, 46, 48, 50, 52, 54, 56, 58, 60, 62, 64, 66, 68, and 70 parts by weight of a polyphenylene ether resin, based on the total weight of the rubber modified aromatic vinyl resin and the polyphenylene ether resin.

Cyclic Alkyl Phosphonate Ester Compound

In some embodiments, a cyclic alkyl phosphonate ester compound is represented by the following chemical Formula (I):

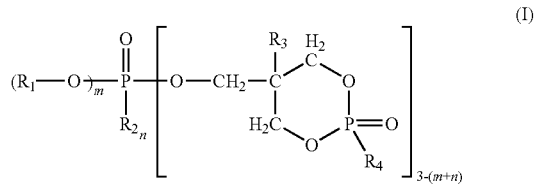

In the formula, $R_1$, $R_2$ and $R_4$ are independently $C_{2-10}$ alkyl, $R_3$ is ethyl, m and n are independently 0, 1 or 2, and (m+n) is 1 or 2.

In some embodiments, $R_1$, $R_2$ or $R_4$ can be ethyl, propyl, butyl, pentyl, hexyl, heptyl, octyl, nonyl, and decyl. $R_1$, $R_2$ or $R_4$ may also be branched to form a substituent of up to 10 carbons. For example, $R_1$, $R_2$ or $R_4$ may be tert-butyl, sec-butyl, or n-butyl. Another example would be n-heptyl that can be substituted with up to three methyl groups at any position on the heptyl carbon chain. Yet another example would be 4-methyl octyl.

In embodiments, more than one cyclic alkyl phosphonate ester compound may be used in a mixture. For example, a mixture of cyclic alkyl phosphonate ester compounds may include about 0 to about 90 weight percent of butyl-bis[(5-ethyl-2-butyl-1,3,2-dioxaphorinan-5-yl)methyl]ester P, P'-dioxide phosphonate where $R_1$, $R_2$ and $R_4$ are butyl, $R_3$ is ethyl, m is 0 and n is 1, and about 10 to about 100 weight percent of butyl-(5-ethyl-2-butyl-1,3,2-dioxaphorinan-5-yl) methyl butyl ester P-oxide phosphonate where $R_1$, $R_2$ and $R_4$ are butyl, $R_3$ is ethyl, m is 1, and n is 1. Another embodiment of the mixture may include about 0 to about 90 weight percent of hexyl-bis[(5-ethyl-2-hexyl-1,3,2-dioxaphorinan-5-yl)methyl]ester P, P'-dioxide phosphonate where $R_1$, $R_2$ and $R_4$ are hexyl, $R_3$ is ethyl, m is 0, and n is 1, and about 10 to weight percent of hexyl-(5-ethyl-2-hexyl-1,3,2-dioxaphorinan-5-yl) methyl]hexyl ester P-oxide phosphonate where $R_1$, $R_2$ and $R_4$ are hexyl, $R_3$ is ethyl, m is 1, and n is 1. However, $R_1$, $R_2$, and $R_4$ need not be the same substituent in the compound. For example, $R_1$ may be ethyl, $R_2$ may be pentyl, and $R_4$ may be hexyl in the same phosphonate compound.

In embodiments, the polymer composition comprises about 0.1 to about 30 parts by weight of a cyclic phosphonate ester compound. In other embodiments, the polymer composition comprises about 0.03, 0.05, 0.07, 0.09, 0.1, 0.3, 0.5, 0.75, 0.9, 1, 2, 4, 5, 7, 8, 9, 10, 11, 12, 14, 16, 18, 20, 22, 24, 26, 28, 30, 32, 34, 36, 38, 40, and 45 parts by weight of the cyclic phosphonate ester compound based on the total weight of the rubber modified aromatic vinyl resin and the polyphenylene ether resin being 100 parts by weight.

Aromatic Phosphate Ester Compound

In embodiments, the aromatic phosphate ester compound comprises the following structural Formula (II):

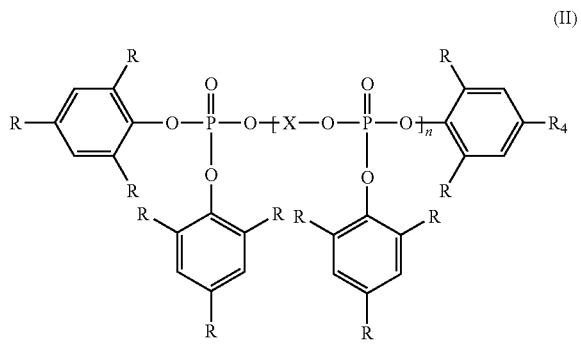

In the formula, R on each phenyl group are each independently hydrogen, alkyl, or substituted alkyl, and are independent of an R on a different phenyl group. For example, R can be selected from methyl, ethyl, propyl, isopropyl, butyl, sec-butyl, tert-butyl. In some embodiments, R is selected from independent alkyl groups which comprise from two to four carbon atoms. However, embodiments are not limited to four carbon chains and may be branched alkyl groups. R may be selected independent from another R on the same or a different phenyl group of the aromatic phosphonate ester compound.

In the formula, X is derived from a X is derived from an aryl compound comprising one or more hydroxy groups. In the formula, n is 0 to 4, including 0, 1, 2, 3 or 4.

For example, if X is derived from hydroquinone, then X would be a phenylene wherein a phenyl group would be disposed between the two oxygen atoms shown in the structural formula (as connected to X), and these oxygen atoms would be covalently bonded to the phenylene group in respective para positions. For another example, if X is derived from resorcinol, then X would be a phenylene wherein a phenyl group would be disposed between the two oxygen atoms shown in the structural formula (as connected to X), and these oxygen atoms would be covalently bonded to the phenylene group in respective meta positions. Other variations of this will be apparent to those having ordinary skill in the art. Thus, X can be derived from compounds such as hydroquinone, resorcinol, bisphenol A, naphthalene-2,6-diol, naphthalene-2,7-diol, and so forth. Thus, in some embodiments, X is arylene or multiple aryl groups.

Where n is 0, the aromatic phosphate ester compound may be triphenyl phosphate, tricresyl phosphate, trixylenyl phosphate, tri(2,6-dimethyl phenyl)phosphate, tri(2,4,6-trimethyl phenyl)phosphate, tri(2,4-ditertiary butyl phenyl)phosphate, tri(2,6-ditertiary butyl phenyl)phosphate, and the like; where n is 1, the aromatic phosphate ester compound may include resorcinol bis(diphenyl)phosphate, resorcinol bis(2,6-dimethyl phenyl)phosphate, resorcinol bis(2,4-ditertiary butyl phenyl)phosphate, hydroquinol bis(2,6-dimethyl phenyl)phosphate, hydroquinol bis(2,4-ditertiary butyl phenyl)phosphate, and the like. The aromatic phosphate ester compound can be used alone or in combination with other aromatic phosphate ester compounds.

In embodiments, the polymer composition comprises about 0.1 to about 20 parts by weight of the aromatic phosphate compound, including about 0.1, 0.2, 0.3, 0.4, 0.5, 0.6, 0.7, 0.8, 0.9, 1, 1.5, 2, 2.5, 3, 3.5, 4, 4.5, 5, 6, 7, 8, 9, 10, 12, 14, 16, 18, and 20 parts by weight, based on the total weight of the rubber modified aromatic vinyl resin and the polyphenylene ether resin being 100 parts by weight. Other embodiments may also comprises less than 0.1 parts by weight including 0.03, 0.06, and 0.09 parts by weight of the aromatic phosphate ester, and may also comprise more than 20 parts by weight, including 22, 24, 26, 28, 30, 32, 34, 36, 38, and 40 parts by weight of the aromatic phosphate ester, based on the total weight of the rubber modified aromatic vinyl resin and the polyphenylene ether resin being 100 parts by weight Additional Components According to embodiments, the polymer composition may contain one or more compounds or polymers in addition to the foregoing components. Additional components or additives may be added to provide additional properties or characteristics to the molding composition or to modify existing properties of the composition. Other additives may be contained in the polymer composition including, but not limited to, a conventional flame retardant, an anti-dripping agent, an impact modifier, a plasticizer, inorganic filler, a heat stabilizer, an anti-oxidant, a compatibilizer, a light stabilizer, a lubricant, a pigment, and/or dye. The additives are employed in the amount of about 0 to about 30 parts by weight on the basis of 100 parts by weight of the molding composition. For example, an inorganic filler such as glass fiber, carbon fiber, talc, silica, mica, and alumina may be added to improve mechanical strength and heat distortion temperature of the resin composition. One of ordinary skill in the art will appreciate that various additives may be added to the molding compositions according to embodiments of the invention.

Preparation of Embodiments of Compositions

In embodiments, the molding compositions are prepared by mixing their components including a rubber modified aromatic vinyl resin, a polyphenylene ether resin, and a cyclic phosphonate ester compound. In some embodiments, one or more other additives may be mixed together with the components of the molding composition. In some embodiments, one or more component resins may be heated to melt prior to the mixing or the composition may be heated during the mixing. The mixing may occur when each components is in a solid, liquid, or dissolved state, or mixtures thereof. In one embodiment, the above components are mixed together all at once. Alternatively, one or more components are added individually. For example, the ABS copolymer resin may first be mixed with the. impact modifier, prior to mixing this admixture with the remaining components. Formulating and mixing the components may be made by any method known to those persons having ordinary skill in the art, or those methods that may be later discovered. The mixing may occur in a pre-mixing state in a device such as a ribbon blender, followed by further mixing in a Henschel mixer, Banbury mixer, a single screw extruder, a twin screw extruder, a multi screw extruder, or a cokneader.

Enhanced Properties

An advantage of certain preferred embodiments is that they provide molding compositions which have good flame retardancy, impact strength, and heat resistance, but do not show deterioration of thermal stability during processing. Another advantage of such embodiments is that they provide a thermoplastic resin composition with good flame retardancy and thermal stability.

As noted above, one advantage of certain embodiments is that the composition shows enhanced physical or mechanical properties as compared to other polymer composition containing a cyclic phosphonate esters represented by Formula (I) wherein $R_1$, $R_2$, or $R_4$ is a methyl group. Some embodiments of the polymer composition are less susceptible to physical discoloration or streaking when the composition is staid at 270° C. In certain embodiments, the compositions are also able to maintain excellent impact strength and thermal stability. These properties can be measured by a Notched Izod Impact Strength and Vicat softening temperature as described below.

In addition, certain embodiments of the compositions have excellent flame retardancy. In some embodiments, when samples of the shaped articles are tested under the standard UL94VB (1/12"), the samples had a flame retardancy of V-0.

Additionally, some embodiments of the composition also demonstrated excellent Vicat Softening Temperature greater than or equal to about 85° C., 86° C., 87° C., and 88° C. when samples of the composition were tested under the standard ASTM D-1525 under a 5 kgf load.

Other embodiments exhibit maintained impact strength as compared to polymer compositions less one or more components. The impact strengths of samples tested under the standard D-256A (1/8" sample) at 23° C. is at least about 25, 27, 30, and 31 kg·cm/cm.

According to embodiments, the molding composition may be less susceptible to discoloration. Some preferred embodiments exhibit a ΔE less than about 0.5 at 270° C. In other embodiments, the ΔE can be about 0.1, 0.2, 0.3, 0.4, or 0.5. FIG. 1 is a photograph illustrating the discoloration of the Examples and Comparative Examples which were exposed to 300° C. Some embodiment of the composition exhibited little to no discoloration, thereby demonstrating excellent thermal stability and resistance.

Shaped Articles of Electronic Devices

Another embodiment provides a shaped article using the polymer composition according to the foregoing embodiments. The compositions may be molded into various shapes. For molding with the composition, an extrusion molding machine such as a vented extruder may be used. The molding composition of embodiments may be molded into various moldings using, for example, a melt-molding device. In embodiments, the molding composition is formed into a pellet, which then may be molded into various shapes using, for example, injection molding, injection compression molding, extrusion molding, blow molding, pressing, vacuum forming or foaming. In one embodiment, the molding composition can be made into a pellet using melt-kneading, and the resulting pellets are molded into moldings through injection molding or injection compression molding.

As noted, in one embodiment, the thermoplastic compositions are formed into pellets. In other embodiments, the thermoplastic compositions are formed into structural parts of various consumer products, including electronic devices and appliances. In some embodiments, the molding compositions are molded into a housing or body of electronic or non-electronic devices. Examples of electrical devices in which a molded article made of the blend of the composition according to embodiments of the invention include printers, computers, word processors, keyboards, personal digital assistants (PDA), telephones, mobile phones, facsimile machines, copy machines, electronic cash registers (ECR), desk-top electronic calculators, PDAs, cards, stationery holders, washing machines, refrigerators, vacuum cleaners, microwave ovens, lighting equipment, irons, TV, VTR, DVD players, video cameras, radio cassette recorders, tape recorders, mini disc players, CD players, speakers, game machines, liquid crystal displays, MP3 players, and electric or electronic parts and telecommunication equipment, such as connectors, relays, condensers, switches, printed circuit boards materials, coil bobbins, semiconductor sealing materials, electric wires, cables, transformers, deflecting yokes, distribution boards, clocks, watches, and the like.

The features of the invention may be further described with reference to the following examples. These examples are intended for the purpose of illustration and are not to be construed any way as to limit the scope of the present invention.

EXAMPLES

In the following examples, the molding composition comprises a rubber modified aromatic vinyl resin, a polyphenylene ether resin, and at least one cyclic alkyl phosphonate ester. In the rubber modified aromatic vinyl resin, there is a styrene containing graft copolymer resin and a vinyl resin. Some examples of the vinyl resin include rubber. Other examples also include an aromatic phosphate ester compound as described herein. The amount of the resins and compounds used in the examples and comparative examples are listed in Table I. The components of the examples and comparative examples are described below:

(A) Rubber Modified Aromatic Vinyl Resin

In the examples of the rubber modified aromatic vinyl resin, there is a styrene containing graft copolymer resin and a vinyl resin as described below:

(a1) Styrene-Containing Graft Copolymer Resin

Examples of the styrene containing graft copolymer resin are described below as a11, a12, and a13. Parts is part by weight throughout the specification.

a11: This styrene-containing graft copolymer resin is made by mixing 50 parts of butadiene rubber latex powder, 45 parts of styrene, 2.5 parts of acrylonitrile, and 150 parts of deionized water. To this was added, 1.0 part of potassium oleate, 0.4 parts of cumenhydroperoxide, 0.2 parts of a mercaptan-containing chain transfer agent, 0.4 parts of glucose, 0.01 parts of ferrous sulfate hydrate, and 0.3 parts of sodium pyrophosphate. The blend was kept at 75° C. for 5 hours to obtain g-ABS latex. To the g-ABS latex, 0.4 parts of sulfuric acid was added and coagulated to obtain graft copolymer resin in a powder form.

a12: This styrene-containing graft copolymer resin was conducted in the same manner as a11 except that 7.5 parts by weight of acrylonitrile was used.

a13: This styrene-containing graft copolymer resin was conducted in the same manner as a11 except that 12 parts by weight of acrylonitrile was used.

(a2) Vinyl Resin

Examples of the vinyl resin are described below as a21 and a22, and a13.

a21: This vinyl resin was general purpose polystyrene (GPPS) of Cheil Industries Inc. of Korea (product name: HF-2680) with a weight average molecular weight of 210,000.

a22: This vinyl resin was High impact polystyrene (HIPS) of Cheil Industries Inc. of Korea (Product name: HI-1190). The particle size of butadiene rubber was 0.3 μm and the content of rubber was 11% by weight.

(B) Polyphenylene Ether Resin (PPE)

Poly (2,6-dimethyl-phenyl ether) by Asahi Kasei Co. of Japan (product name: P-402) in the form of powder was used. The particles had the average size of several microns.

(C) Cyclic Alkyl Phosphonate Ester Compound

Examples of the cyclic alkyl phosphonate ester compound are described in c1, c2, c3, and c4.

c1: SDP-M by Rhodia Co. [a mixture of 22% by weight of butyl-(5-ethyl-2-butyl-1,3,2-dioxaphorinan-5-yl)methyl butyl ester P-oxide phosphonate and 71% by weight of butyl-bis[(5-ethyl-2-butyl-1,3,2-dioxaphorinan-5-yl)methyl]ester P, P'-dioxide phosphonate] was used.

c2: SDP-M/H of Rhodia Co. [a mixture of 39% by weight of hexyl-(5-ethyl-2-hexyl-1,3,2-dioxaphorinan-5-yl)methyl hexyl ester P-oxide phosphonate and 53% by weight of hexyl-bis[(5-ethyl-2-hexyl-1,3,2-dioxaphorinan-5-yl)methyl]ester P, P'-dioxide phosphonate] was used.

c3: Antiblaze 1045 of Rhodia Co. which contains 20.8% of phosphorus [a mixture of 8% by weight of methyl-(5-ethyl-2-methyl-1,3,2-dioxaphorinan-5yl)methyl methyl ester P-oxide phosphonate and 85% by weight of methyl-bis [(5-ethyl-2-methyl-1,3,2-dioxaphorinan-5yl)methyl]ester P, P'-dioxide phosphonate] was used.

c4: DCU by Rhodia Co. [a mixture of 26% by weight of decyl(5-ethyl-2-methyl-1,3,2-dioxaphorinan-5-yl)methyl methyl ester P-oxide phosphonate and 68% by weight of decyl-bis[(5-ethyl-2-methyl-1,3,2-dioxaphorinan-5-yl)methyl]ester P, P'-dioxide phosphonate] was used.

(D) Aromatic Phosphate Ester Compound

Resorcinol bis-(2,6-dimethylphenyl)phosphate produced by Daihachi Chemical of Japan (product name: PX200) was used.

The components of the molding composition examples and comparative examples as shown in Table 1 were mixed and the mixture was extruded at 200-280° C. with a conventional twin screw extruder in pellets. The resin pellets were dried at 80° C. for 3 hours, and molded into test specimens using a 6 oz injection molding machine at 180-280° C. and mold temperature of 40-80° C. The flame retardancy of the test specimens was measured in accordance with UL94VB with a thickness of 1/12". The Izod impact strength was measured in accordance with ASTM 256A with a thickness of 1/8". The heat resistance was measured according to ASTM D-1525 under 5 kgf. The test results are also presented in Table 1.

In addition, ΔE represents a value of discoloration. The color difference between the injection molding resin which was staid for 20 min at 270° C. and the injection molding resin which was not staid was measured by spectrophotometer. The resin was molded into test specimens at 300° C. and observed whether or not yellow streak was generated of the resin by the naked eye.

TABLE 1

| | | | Examples | | | | | | | | Comparative Examples | | |
|---|---|---|---|---|---|---|---|---|---|---|---|---|---|
| | | | 1 | 2 | 3 | 4 | 5 | 6 | 7 | 8 | 1 | 2 | 3 |
| (A) | (a1) | (a11) | 20 | 20 | 20 | 20 | 20 | — | — | — | 20 | 20 | 20 |
| | | (a12) | — | — | — | — | — | 20 | — | — | — | — | — |
| | | (a13) | — | — | — | — | — | — | 20 | — | — | — | — |
| | (a2) | (a21) | 20 | 45 | — | 20 | — | 20 | 20 | — | 20 | 20 | 20 |
| | | (a22) | 25 | — | 45 | 25 | 45 | 25 | 25 | 65 | 25 | 25 | 25 |
| (B)PPE | | | 35 | 35 | 35 | 35 | 35 | 35 | 35 | 35 | 35 | 35 | 35 |
| (C) cyclic alkyl phosphonate ester compound | (c1) | | 15 | 9 | 3 | — | — | 15 | — | 15 | — | — | — |
| | (c2) | | — | — | — | 15 | 3 | — | 15 | — | — | — | — |
| | (c3) | | — | — | — | — | — | — | — | — | 15 | — | — |
| | (c4) | | — | — | — | — | — | — | — | — | — | 15 | — |
| (D) aromatic phosphate ester compound | | | — | 7 | 13 | — | 13 | — | — | — | — | — | 19 |
| UL 94, 1/12" | | | V-0 | V-0 | V-0 | V-0 | V-0 | V-0 | V-0 | V-0 | V-0 | V-0 | V-1 |
| Izod Impact strength (1/8") (kg · cm/cm) | | | 31 | 25 | 28 | 30 | 27 | 27 | 25 | 13 | 31 | 30 | 25 |
| Vicat softening Temp. (° C.) | | | 87 | 85 | 84 | 87 | 85 | 87 | 88 | 87 | 87 | 88 | 82 |
| ΔE (at 270° C.) | | | 0.3 | 0.2 | 0.2 | 0.2 | 0.2 | 0.2 | 0.3 | 0.2 | 2.5 | 1.0 | 0.2 |

As shown above, the resin compositions employing a cyclic alkyl phosphonate ester compound as a flame retardant show higher flame retardancy without deteriorating heat resistance compared to those employing an aromatic phosphonate ester alone.

Especially, the resin compositions employing cyclic phosphonate ester of which alkyl group ($R_1$, $R_2$, and $R_4$ as represented in Formula (I)) is butyl or hexyl (SDP-M, SDP-M/H) demonstrated higher heat resistance during processing than those employing cyclic phosphonate ester of wherin at least one alkyl group is methyl (Antiblaze 1045, DCU).

The skilled artisan will recognize the interchangeability of various features from different embodiments. Similarly, the various features and steps discussed above, as well as other known equivalents for each such feature or step, can be mixed and matched by one of ordinary skill in this art to perform compositions or methods in accordance with principles described herein. Although the invention has been disclosed in the context of creatin embodiments and examples, it will be understood by those skilled in the art that the invention extends beyond the specifically disclosed embodiments to other alternative embodiment and/or uses and obvious modifications and equivalents thereof. Accordingly, the invention is not intended to be limited by the specific disclosures of embodiments herein.

What is claimed is:

1. A molding composition comprising:
   about 40 to 95 parts by weight of a rubber modified vinyl aromatic resin;
   about 5 to 60 parts by weight of a polyphenylene ether resin; and
   about 0.1 to about 30 parts by weight of a cyclic phosphonate ester compound, represented by Formula (I):

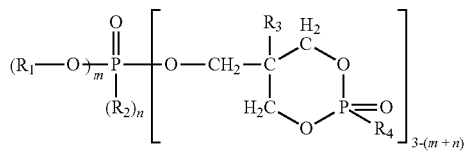

wherein $R_1$, $R_2$ and $R_4$ are independently $C_2$-$C_{10}$ alkyl group; $R_3$ is ethyl; m and n are independently 0, 1 or 2; and (m+n) is 1 or 2.

2. The molding composition of claim 1, wherein m is 1 or 2.

3. The molding composition of claim 1, wherein the rubber modified polystyrene resin comprises:
   a styrene-containing graft copolymer resin;
   and a vinyl resin, wherein the vinyl resin optionally comprises rubber.

4. The molding composition of claim 3, wherein the styrene-containing graft copolymer resin comprises a rubber from about 10 to about 60 parts by weight and a styrene-acrylonitrile copolymer from about 40 to about 90 parts by weight grafted on the rubber.

5. The molding composition of claim 3, wherein the vinyl resin comprises about 0.1 to about 20 parts by weight of rubber selected from the group consisting of a butadiene rubber, an isoprene rubber, a copolymer of butadiene and styrene, an alkyl acrylate rubber, and combinations thereof.

6. The molding composition of claim 1, wherein the polyphenylene ether resin is poly(2,6-dimethyl-1,4-phenylene)ether.

7. The molding composition of claim 1, further comprising an aromatic phosphate ester.

8. The molding composition of claim 7, wherein the aromatic phosphate ester is about 0 to about 20 parts by weight based on the rubber modified polystyrene resin, polyphenylene ether resin, and the cyclic phosphonate ester totaling 100 parts by weight of the molding composition.

9. The molding composition of claim 7, wherein the aromatic phosphate ester is

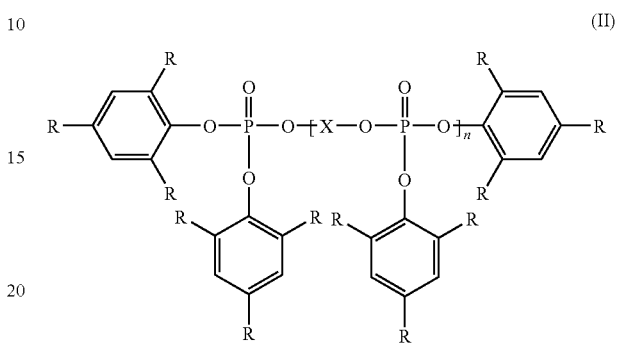

wherein each R is independently hydrogen or $C_{1-4}$ alkyl;
   X is derived from a compound comprising two hydroxyaryl groups; and n is 0 to 4.

10. The molding composition of claim 9, wherein the aryl compound comprising two hydroxyaryl groups is selected from the group consisting of resorcinol, hydroquinone, bisphenol-A, and combinations thereof.

11. The molding composition of claim 1, further comprising a flame retardant, an anti-dripping agent, an impact modifier, a plasticizer, an inorganic filler, a heat stabilizer, an anti-oxidant, a compatibilizer, a light stabilizer, a pigment, a dye, and combinations thereof.

12. A molding composition of claim 1, formed in a shaped article.

13. A molded article comprising the molding composition of claim 12, wherein the article has ΔE less than about 0.5 at 270° C.

14. A composition of claim 1 wherein $R^3$ is ethyl; m and n are independently 0, 1 or 2, and (m+n) is 1 or 2 and $R^1$, $R^2$ and $R^4$ are independently $C_2$-$C_{10}$ alkyl group when m=1 and $R^1$, $R^2$ and $R^4$ are independently butyl, pentyl, hexyl, septyl, octyl, nonyl or decyl group when m=0 and n=1.

15. A composition of claim 1 wherein $R^1$, $R^2$ and $R^4$ are independently butyl, pentyl, hexyl, septyl, octyl, nonyl or decyl group.

16. A composition comprising:
   a rubber-modified aromatic vinyl resin;
   a polyphenylene ether resin; and
   a phosphate flame retardant component comprising a cyclic alkyl phosphonate ester compound represented by the following Formula (I):

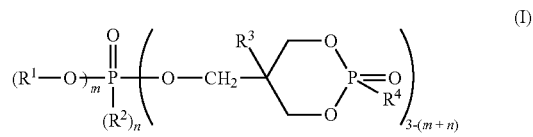

wherein $R^3$ is ethyl; m and n are independently 0, 1 or 2, and (m+n) is 1 or 2 and $R^1$, $R^2$ and $R^4$ are independently $C_2$-$C_{10}$ alkyl group.

17. A composition of claim 16 wherein $R^1$, $R^2$ and $R^4$ are independently $C_2$-$C_{10}$ alkyl group when m=1 and $R^1$, $R^2$ and $R^4$ are independently butyl, pentyl, hexyl, septyl, octyl, nonyl or decyl group when m=0 and n=1.

18. A composition of claim 16 wherein the phosphate flame retardant consists of the cyclic alkyl phosphonate ester of Formula (I).

* * * * *